United States Patent [19]
Lavoillotte

[11] 3,900,931
[45] Aug. 26, 1975

[54] RELEASABLE PANEL FASTENING DEVICE

[76] Inventor: Maurice Lavoillotte, 44 Chemin de Caldana, 06400 Cannes, France

[22] Filed: May 20, 1974

[21] Appl. No.: 471,620

[30] Foreign Application Priority Data
Sept. 18, 1973 France .............................. 73.33364

[52] U.S. Cl. ............... 24/221 R; 24/73 RM; 85/5 P
[51] Int. Cl.² ..................... A44B 17/00; F16B 19/00
[58] Field of Search ......... 24/221 R, 23 RM, 221 L; 85/5 P

[56] References Cited
UNITED STATES PATENTS

| | | | |
|---|---|---|---|
| 157,883 | 12/1874 | Spruce | 24/221 R |
| 1,659,988 | 2/1928 | Bloss | 85/5 P |
| 1,666,783 | 4/1928 | Kries | 85/5 P |
| 1,809,117 | 6/1931 | Golden | 24/221 R |
| 2,373,722 | 4/1945 | Opel | 85/5 P |
| 2,641,814 | 6/1953 | Hartman | 24/221 R |
| 3,231,791 | 1/1966 | Parris | 24/221 R |
| 3,768,064 | 10/1973 | Pabich | 24/221 R |

FOREIGN PATENTS OR APPLICATIONS

| | | | |
|---|---|---|---|
| 1,142,142 | 2/1969 | United Kingdom | 85/5 P |

*Primary Examiner*—Bernard A. Gelak
*Attorney, Agent, or Firm*—William D. Hall

[57] ABSTRACT

A releasable panel fastening device for attaching and locking together a base member and a cover member, applicable, for example, in connection with shelfing components. The base member and cover member have matching buttonhole-type apertures comprising a rectangular slot and a central circular opening. The cover member has a raised portion in the area of its buttonhole and two extensions which engage the slot ends of the base member. A key with a rectangular profile fits into the buttonhole slots. The key has opposing lateral indents so that when the key is rotated 90°, it locks the members together. To insure the locking action, the overall thickness of the base and cover members increases along the paths of the two indents (in the key) when the key is rotated 90°, as aforesaid. This increase in thickness insures that the sidewalls in the indents in the key clamp the base and cover members tightly together.

3 Claims, 4 Drawing Figures

RELEASABLE PANEL FASTENING DEVICE

BACKGROUND OF THE INVENTION

The present invention relates to panel fastening devices and in particular to releasable panel fasteners which are adapted for attaching and locking together two members by means of a key.

While various fastening devices, utilizing a key, are known in the prior art, they all involve drawbacks in one or more circumstances of their field of use.

The primary object of this invention is to provide an inexpensive locking arrangement for fastening two plates together.

Another object is to provide such a device that overcomes the drawbacks of the prior art.

SUMMARY OF THE INVENTION

The invention includes a key for fastening two plates together. The key may be of any suitable shape, such as a rectangle, having opposing indents extending inwardly toward each other and from the opposing longer sides of the rectangle.

The plates each have a slot into which the key may be inserted. One of the plates is placed on top of the other with said slots in alignment. The slots have larger width near their centers than near their ends, so that the key may be rotated. When the key is rotated, the two plates are held together by the side walls of the indents of the key. To insure a more efficient holding action, the combined thickness of the two plates increases along the paths of said indents as the key is rotated after being inserted in the slots.

To protect against one plate twisting with respect to the other plate, the slot in one plate is slightly longer than in the other plate and said other plate has pin(s) therein that extend into the lengthened portion(s) of the slot of the said one plate.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows.

DESCRIPTION OF THE PREFERRED EMBODIMENT

Figure 1:
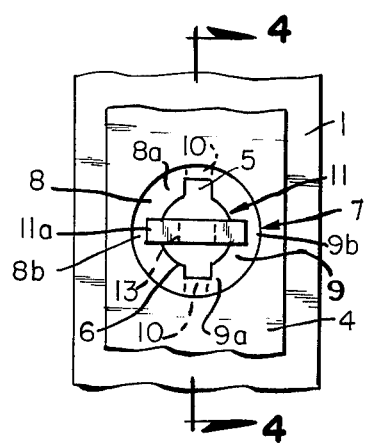
FIG. 1 shows in a plan view two members and a key in locked position, representing an embodiment of the invention.
Figure 2:
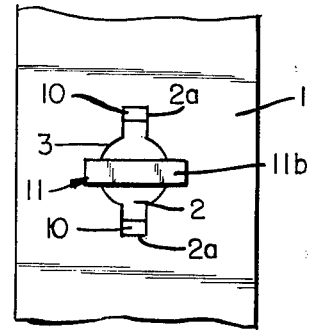
FIG. 2 shows the embodiment of FIG. 1 as seen from the bottom side of the two members.
Figure 4:
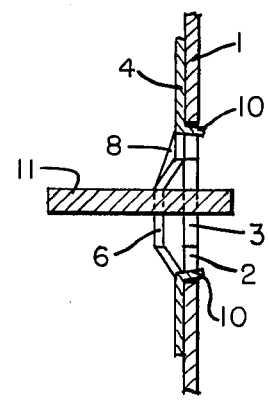
FIG. 4 is a sectional view along line 4—4 of FIG. 1.

Referring to FIGS. 1 and 2 of the drawing, it can be seen that the base member 1 has cut into it an aperture in the shape of a buttonhole, including a generally rectangular slot 2 and a circular opening 3 in its midportion, the opening 3 having a diameter which is greater than the width of the slot 2. A cover member 4, attachable to the base plate 1, as shown in FIG. 4, has cut into it a buttonhole-type aperture 5 which is similar to the aperture 2 of member 1, having also a central opening 6. However, in contrast to member 1, which is flat around its aperture 2, the area including the aperture of member 4 is raised to form a convex protuberance or blister 7 of a generally spherical shape. The diameter of the blister is approximately equal to the overall length of the buttonhole slots 2 and 5.

The protuberance or blister 7 is preferably modified from the purely spherical shape, so as to form diametrically opposite entry ramps 8 and 9 providing a smooth transition from the extremities 8a and 9a of the slot 5 to the highest points 8b and 9b of the blister 7. Said highest points are located at approximately 90° from the direction of the elongation of slot 5.

The buttonhole structure of the cover member 4 further includes two positioning pins 10 extending substantially perpendicularly from its back side in the direction of the base member 1, so as to engage the extremities 2a of its slot 2. To provide space for these pins to enter, the slot 2 in member 1 is slightly longer than the corresponding slot in member 4. These positioning pins are fashioned from those portions of the cover member wall which, prior to the cutting of slot 5, occupied the slot areas located radially outside the circular opening 6. Since pins 10 of plate 4 engage the ends 2a of slot 2 in plate 1, they prevent the plates from twisting with respect to each other when they are locked together.

Figure 3:
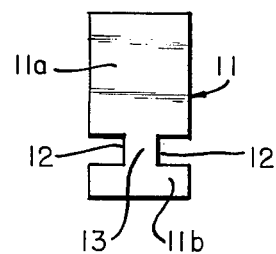
FIG. 3 shows the locking key of the device of FIG. 1.

A simple flat key 11, engaged in the buttonhole structure of the members 1 and 4, serves to attach and lock one member against the other. This key, as illustrated in FIG. 3, is generally rectangular in cross-section, as well as in its overall outline. At a distance from its bottom end, the key includes two opposing indents 12 of generally rectangular shape, the indents 12 defining a stem portion 13 of reduced width and dividing the key 11 into a head portion 11b and a grip portion 11a.

In order to attach the cover member 4 to the base member 1, the former is placed against the latter, whereby its positioning pins 10 engage the extensions 2a of slot 2 of the base member 1 (see FIG. 4). With the panels in this position, the key 11 may be grasped by its longer handle portion 11a and its head portion 11b, inserted through the aligned slots 5 and 2 of both members. The key 11 is then rotated approximately 90° in a counter-clockwise direction, whereby indents 12 progressively engage with the flanks 8a and 9a of the entry ramps 8 and 9 of the blister 7. In the rotated position, in which the key 11 is approximately perpendicular to the orientation of slots 2 and 5 (FIG. 1), the key firmly clamps the cover member 4 at 8b and 9b to the base member 1.

If the ramp portions 8a–8b and 9a–9b of cover member 4 are made of resilient material, the locking or holding action of the key will be improved. It is noted that the combined thickness of members 1 and 4 increases along the path of the indents of the key as it is rotated as explained above. This increase in thickness may be achieved in any suitable way known to mechanics such as by stamping, molding, casting, using a piece with increasing thickness, or affixing added wedge shaped pieces on the plate 4.

The novel structure of the present invention was found to be particularly advantageous in connection with the attaching together of various flat structural components. For example, the invention is applicable to shelfing elements which have flat supports and angle profile members. In such a case, the raised blister would be located in one leg of the angle profile member.

I claim to have invented:

1. A device for fastening together first and second flat plates both of which define an elongated slot through the thickness of the plate, said slots being of generally the same size and shape, each of said slots having a circular middle portion and two diametrically opposed elongated portions of a width and length for receiving the fastening portion of a flat rectangle-shaped key including an elongated handle portion and a short fastening portion having indents which extend inward of each other from opposing edges of the longer sides of said rectangle in the vicinity of one of the shorter sides of said rectangle, the diameter of said circular middle portions being less than the width of said fastening portion and greater than the distance between said indents, one of said plates being wholly flat whilst the area including the circular middle portion of the slot of the other plate is raised to form a blister having opposite entry ramps, whereby the key may be inserted into said elongated slots after said first and second plates have been placed one on the other with their respective slots in alignment when the width of the key is placed in the elongated portions of the slots, and the key may fasten the plates together when it is turned from the position it assumed when it was inserted as aforesaid, with each indent following one of said opposite entry ramps up to the uppermost portion of said blister.

2. A fastening device as defined in claim 1 in which the second plate has resilience to thus cause the key to bind as it is turned in said angular direction.

3. A fastening device as defined in claim 1 in which the elongated slot in one of the plates is slightly longer than in the other plate, said other plate having pins affixed thereto extending into the extreme opposite end portions of the elongated slot of the other plate to thus prevent the plates from twisting with respect to each other when they are fastened together.

* * * * *